United States Patent
Plumb-Larrick et al.

(10) Patent No.: US 10,540,051 B2
(45) Date of Patent: Jan. 21, 2020

(54) IN-CONTEXT USER FEEDBACK PROBE

(71) Applicant: ROCKWELL AUTOMATION TECHNOLOGIES, INC., Mayfield Heights, OH (US)

(72) Inventors: Abigail Plumb-Larrick, Shaker Heights, OH (US); Matthew R. Ericsson, Lyndhurst, OH (US); Timothy A. Weber, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 225 days.

(21) Appl. No.: 14/656,961

(22) Filed: Mar. 13, 2015

(65) Prior Publication Data
US 2016/0266724 A1 Sep. 15, 2016

(51) Int. Cl.
*G06F 3/048* (2013.01)
*G06F 3/0481* (2013.01)
*G06F 3/0482* (2013.01)
*G06F 3/0484* (2013.01)
*G06F 3/0485* (2013.01)

(52) U.S. Cl.
CPC .......... *G06F 3/0481* (2013.01); *G06F 3/0482* (2013.01); *G06F 3/04842* (2013.01); *G06F 3/04855* (2013.01)

(58) Field of Classification Search
None
See application file for complete search history.

(56) References Cited

U.S. PATENT DOCUMENTS

| | | | | |
|---|---|---|---|---|
| 7,802,206 B1* | 9/2010 | Davis | ............. | H04M 1/274525 715/864 |
| 7,827,487 B1* | 11/2010 | Nickerson | ......... | G06F 17/30861 715/711 |
| 2006/0288301 A1* | 12/2006 | Hood | ................. | G06F 9/4443 715/762 |
| 2010/0037166 A1* | 2/2010 | Chandrasekar | ........ | G06Q 30/02 715/769 |
| 2010/0095211 A1* | 4/2010 | Kenvin | ............... | G11B 27/034 715/723 |
| 2012/0197980 A1* | 8/2012 | Terleski | ................. | G06Q 50/01 709/203 |

(Continued)

OTHER PUBLICATIONS

Akanksha Pathak et al., Usability evaluation of touch panel-based mobile device on user interface with multimodal feedback, Mar. 1, 2012, IEEE, pp. 703-708 (Year: 2012).*

(Continued)

*Primary Examiner* — Tam T Tran (57) ABSTRACT

Techniques to facilitate obtaining feedback for an application associated with an industrial automation environment are disclosed herein. In at least one implementation, a graphical user interface (GUI) is displayed on a display system of a computing system, wherein the GUI includes primary content and a user feedback prompt, and the primary content is displayed on a majority of the display system. Responsive to a user selection of the user feedback prompt, the GUI is expanded to reveal a feedback area on the display system that provides a mechanism to receive user feedback. User input comprising the user feedback is then received. Responsive to receiving the user feedback, the GUI is contracted to conceal the feedback area on the display system.

20 Claims, 6 Drawing Sheets

(56) References Cited

U.S. PATENT DOCUMENTS

2014/0026041 A1* 1/2014 Bhargav ............... G06F 17/211
                                                    715/255

OTHER PUBLICATIONS

Catherine Todd et. al, VirtuNav: A Virtual Reality Indoor Navigation Simulator with Haptic and Audio Feedback for the Visually Impaired, Dec. 1, 2014, IEEE, pp. 1-8 (Year: 2014).*

* cited by examiner

IN-CONTEXT USER FEEDBACK PROBE

TECHNICAL FIELD

Aspects of the disclosure are related to computing hardware and software technology.

TECHNICAL BACKGROUND

Software applications that run on computing systems typically provide some type of user interface to present information to the user and receive user inputs. User testing attempts to determine a user's level of satisfaction or ease of use that the user experiences when operating or interacting with the user interface of a software application. Some usability testing depends on click tracking or examination of other user inputs, eye tracking, or navigation analysis, but some kinds of user testing require direct feedback from a user.

When a software user is performing a task with the software, seeking feedback on the user interface often results in an interruption of that task. Unfortunately, interrupting a user's workflow by requesting feedback has an impact on the experience being measured, which is commonly referred to as the observer effect. Additionally, feedback devices are often intrusive and can even navigate a user away from the task at hand. For example, a user viewing a webpage may be presented with a pop-up window asking for the user's feedback, effectively blocking the webpage from the user's view.

OVERVIEW

Techniques to facilitate obtaining feedback for an application associated with an industrial automation environment are disclosed herein. In at least one implementation, a graphical user interface (GUI) is displayed on a display system of a computing system, wherein the GUI includes primary content and a user feedback prompt, and the primary content is displayed on a majority of the display system. Responsive to a user selection of the user feedback prompt, the GUI is expanded to reveal a feedback area on the display system that provides a mechanism to receive user feedback. User input comprising the user feedback is then received. Responsive to receiving the user feedback, the GUI is contracted to conceal the feedback area on the display system.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations disclosed herein provide for gathering user feedback with minimal measurement impact by revealing a hidden survey question or probe within the context of a given workflow. In order to determine a user's level of satisfaction or difficulty when interacting with a user interface or performing a task, direct feedback from the user is often the best approach for measuring the user's experience. However, when a software user is performing a task, it can be difficult to seek feedback on the user interface without interrupting that task, which can have an impact on the experience being measured. The techniques disclosed herein facilitate acquiring user feedback without interrupting the process or removing the user from the context of the workflow.

In at least one implementation, a computing system can display a graphical user interface (GUI) on a display system which provides a subtle and unobtrusive user feedback prompt during or after a user's workflow process. If the user selects the feedback prompt, a feedback area is expanded on the GUI to reveal a short survey question, typically pertaining to the user's experience with operating the user interface or other aspects of the software process. After the user answers the question, the feedback area is removed from the GUI, allowing the user to quickly return focus to the software process and continue working on the task at hand. This expanding and contracting "accordion" feedback interface enables gathering of feedback information with minimal user workflow interruption.

Figure 1:
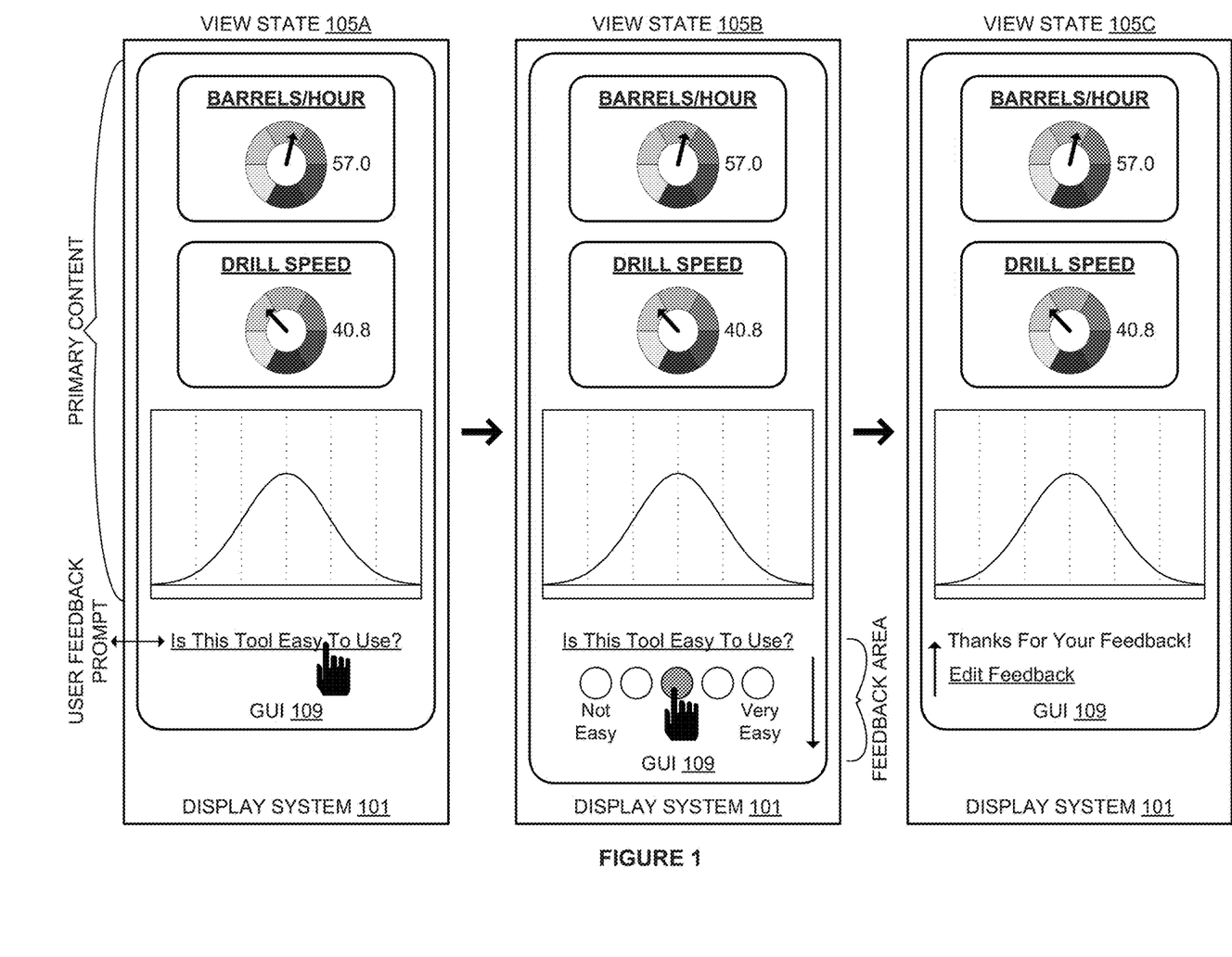
FIG. 1 is a block diagram that illustrates an operational scenario of a graphical user interface on a display system in an exemplary implementation.
Figure 2:
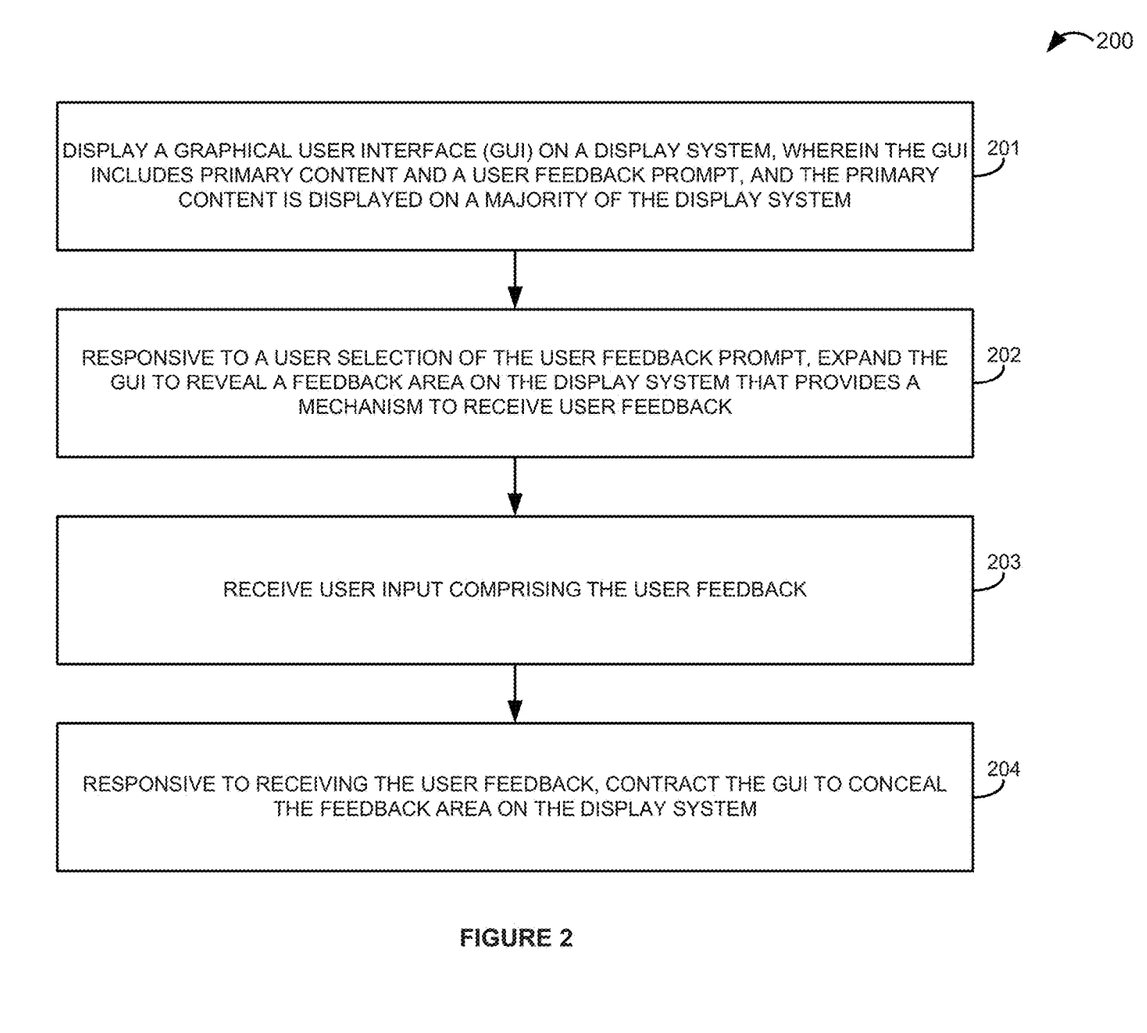
FIG. 2 is a flow diagram that illustrates an operation of a computing system in an exemplary implementation.
Figure 3:
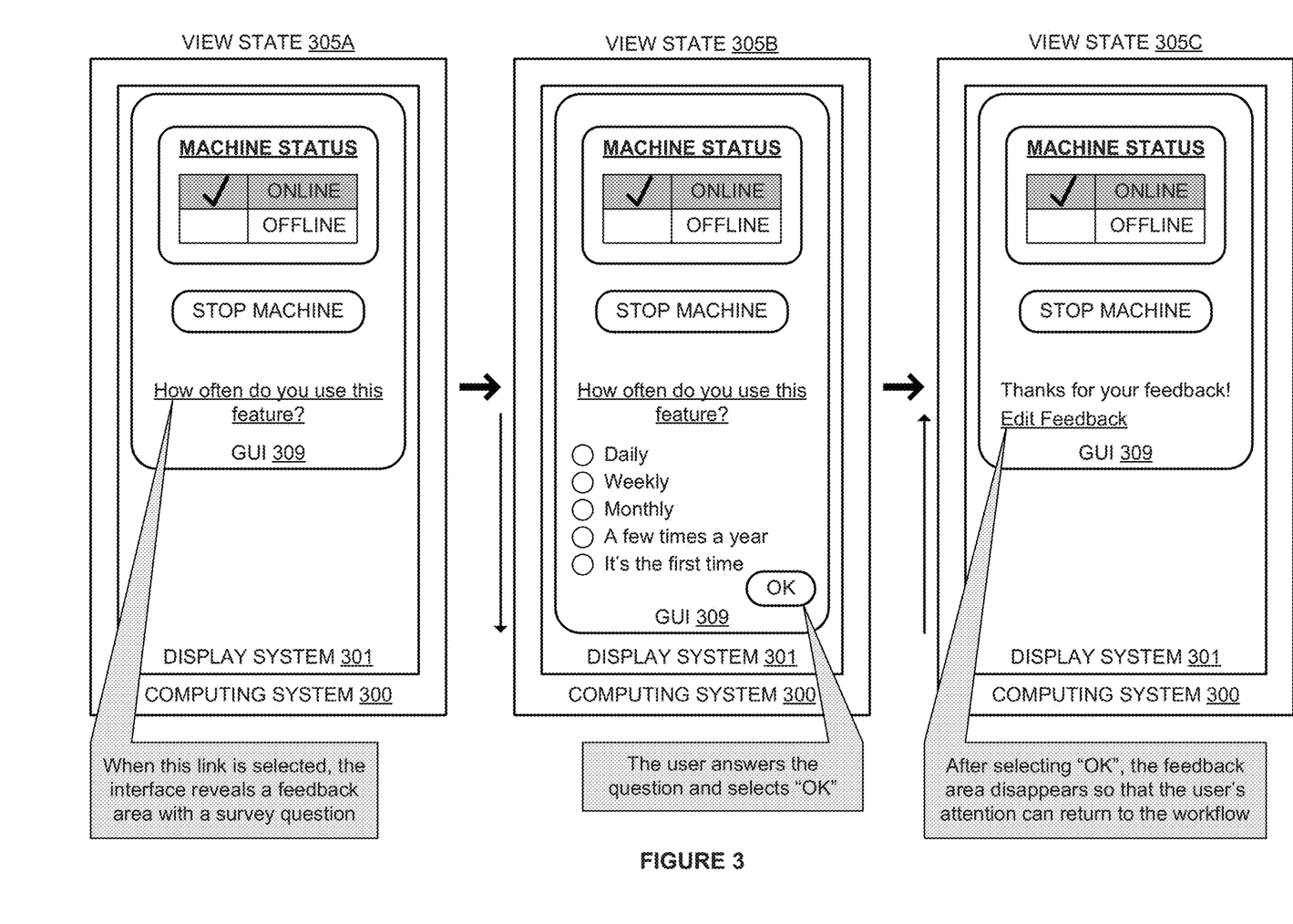
FIG. 3 is a block diagram that illustrates an operational scenario of a computing system in an exemplary implementation.
Figure 4:
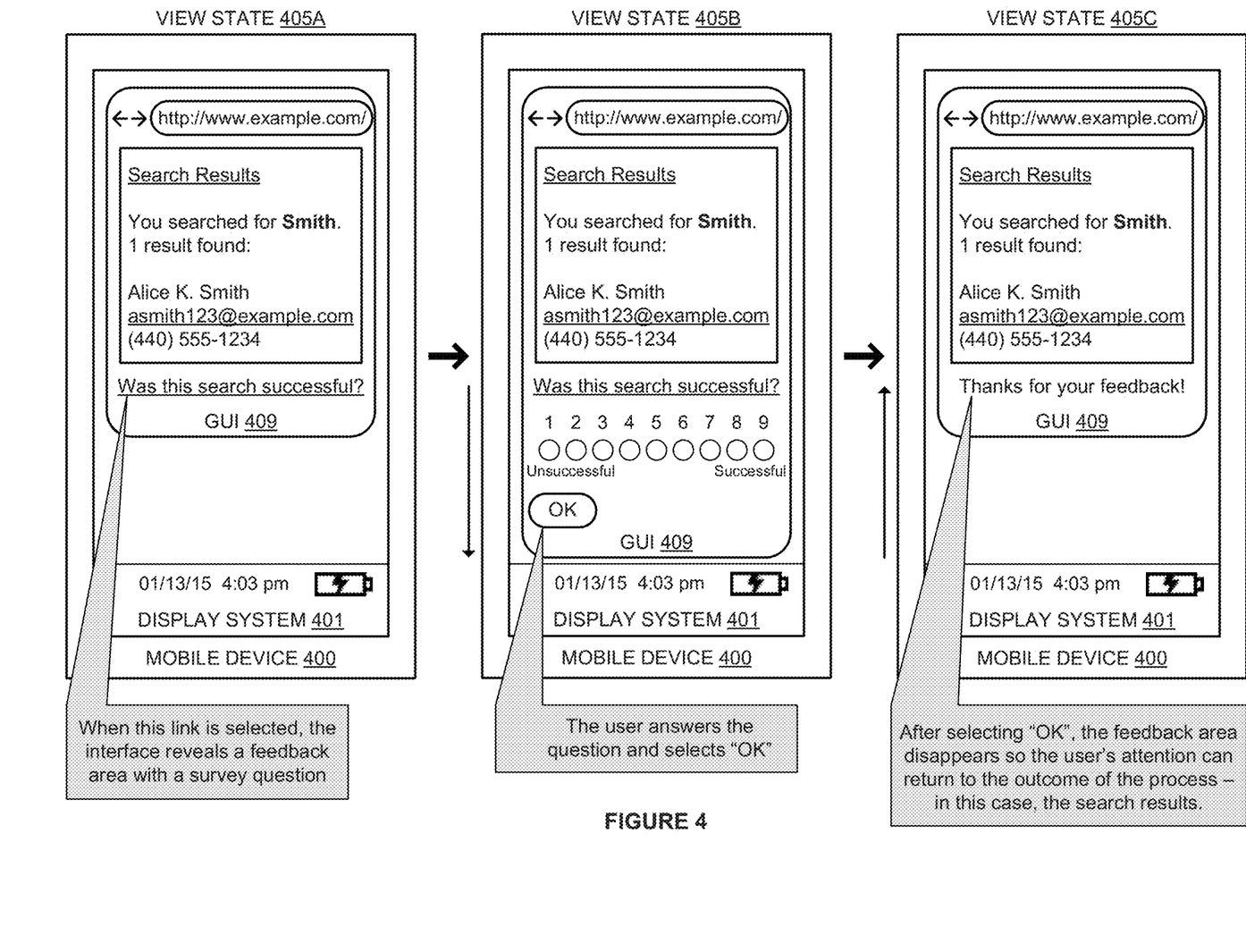
FIG. 4 is a block diagram that illustrates an operational scenario of a mobile device in an exemplary implementation.
Figure 5:
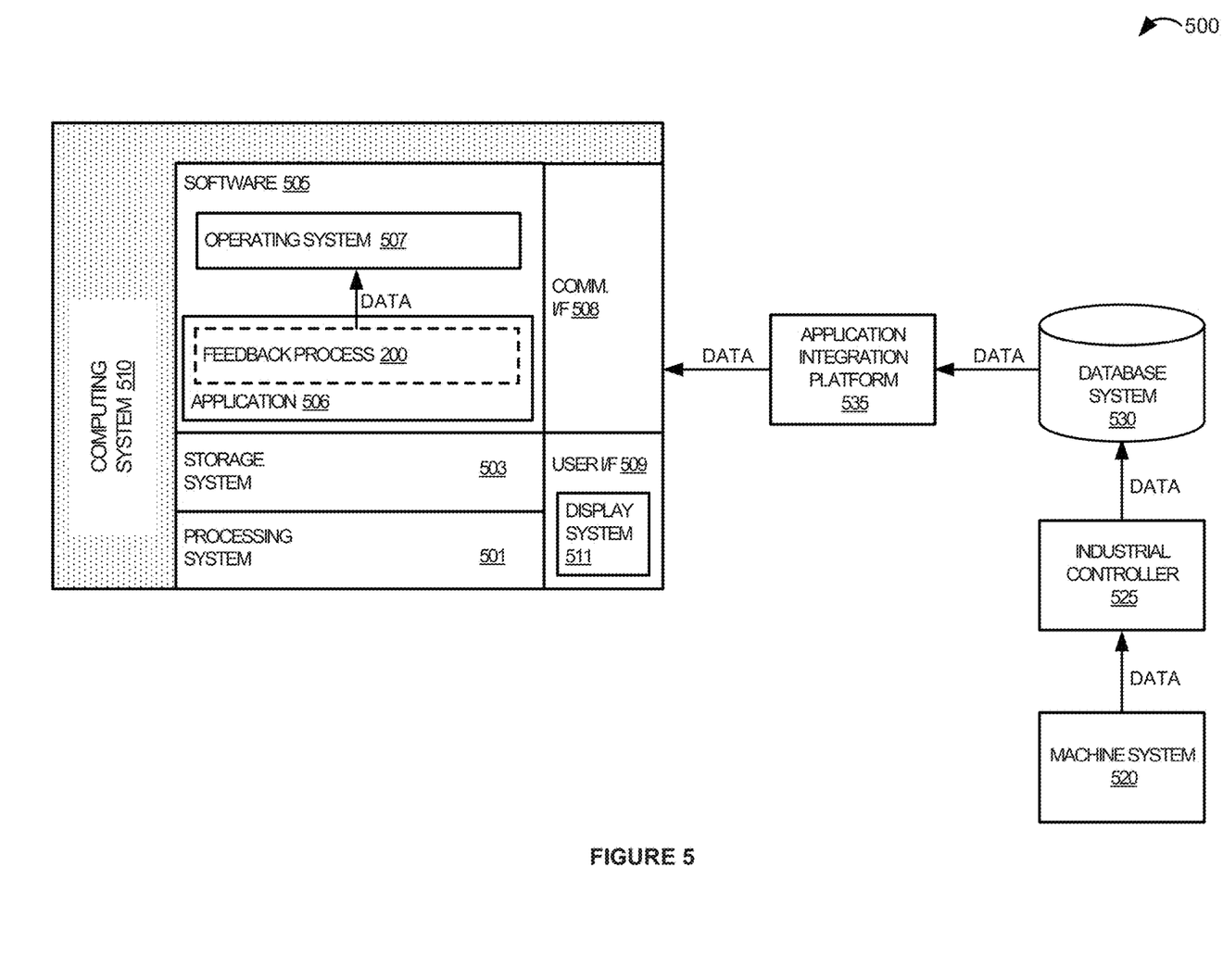
FIG. 5 is a block diagram that illustrates an operational scenario involving a computing system in an industrial automation environment in an exemplary implementation.
Figure 6:
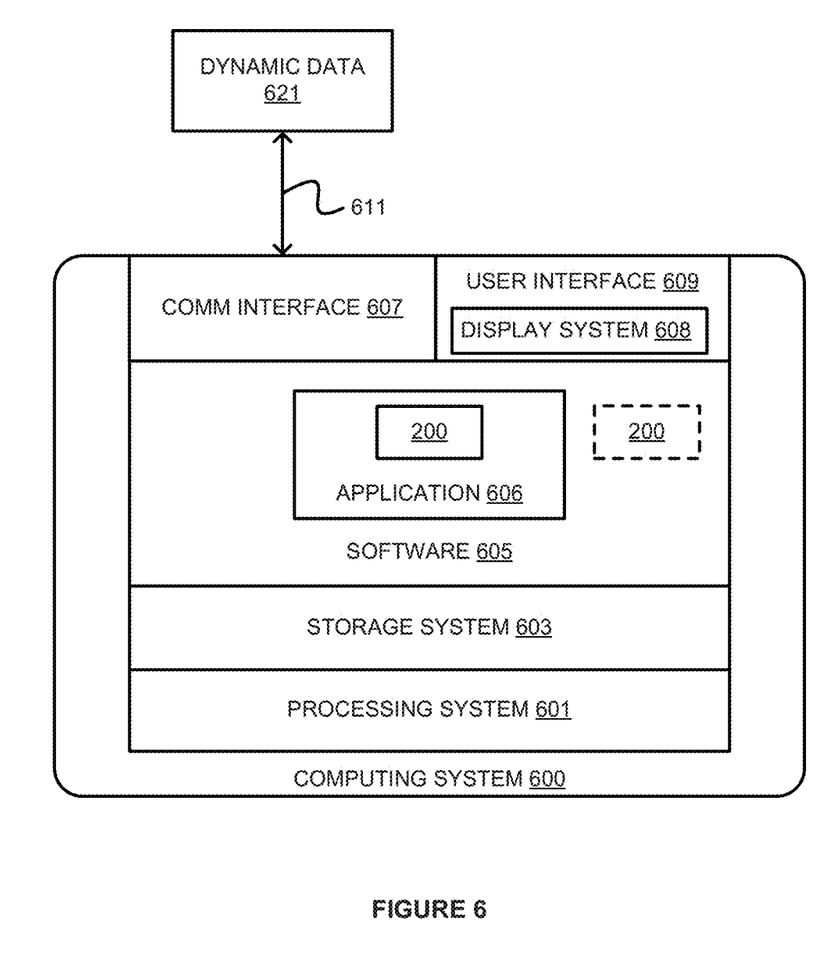
FIG. 6 is a block diagram that illustrates a computing system in an exemplary implementation.

Referring now to the drawings, FIG. 1 illustrates an operational scenario in which a user interacts with an application through a graphical user interface to provide feedback on the usability of the application according to a feedback process, while FIG. 2 illustrates the feedback process. FIG. 3 illustrates an operational scenario involving a computing system that provides a user feedback probe during the user's workflow process in an exemplary implementation, while FIG. 4 illustrates an operational scenario involving a mobile device that provides a user feedback probe at the end of a process in another exemplary implementation. FIG. 5 illustrates an exemplary industrial automation environment that includes a computing system that may be used to execute an application and its feedback process, and FIG. 6 illustrates an exemplary computing system that may be used to perform any of the feedback processes and operational scenarios described herein.

Turning now to FIG. 1, an operational scenario is illustrated involving display system 101 in an exemplary implementation. As shown in FIG. 1, display system 101 includes graphical user interface (GUI) 109. Display system 101 typically receives data to display from a computing system, and may be integrated within the computing system, such as a laptop computer, tablet, or smartphone, or may be separate from the computing system, including geographical separation over a communication network. In some examples, display system 101 could comprise any type of general-purpose display, such as a cathode ray tube (CRT) screen, liquid crystal display (LCD) monitor or television, organic light-emitting diode (OLED) display, plasma display panel (PDP), rear-projection television, image projector, and any other kind of display device.

In this example, display system 101 comprises a touch screen that displays GUI 109 for the user to interact with and accepts input commands from the user via the user's touch on the surface of the touch screen, as represented by the hand icon appearing in FIG. 1. However, user input could be provided by a variety of different techniques in other examples, such as entering text commands with a keyboard, clicking a mouse pointer, speaking a voice command, or any other user input mechanism. In FIG. 1, three different view states are shown displayed on display system 101, labeled 105A, 105B, and 105C. The different view states 105A-105C show the changes that occur to GUI 109 as the user makes selections and interacts with GUI 109. An operation involving display system 101 and GUI 109 will now be described with respect to the flow diagram of FIG. 2 in one exemplary implementation.

FIG. 2 is a flow diagram that illustrates an operation 200 of a computing system in an exemplary implementation. The operation 200 shown in FIG. 2 may also be referred to as feedback process 200 herein. The steps of the operation are indicated below parenthetically. The following discussion of feedback process 200 will proceed with reference to display system 101 and GUI 109 of FIG. 1 in order to illustrate its operations, but note that the details provided in FIG. 1 are merely exemplary and not intended to limit the scope of feedback process 200 to the specific implementation shown in FIG. 1.

Feedback process 200 may be employed to operate a computing system to facilitate obtaining feedback for an application associated with an industrial automation environment. Feedback process 200 could also be employed by a computing system to facilitate receiving user feedback for any software application irrespective of its purpose or functionality, including a website or webpages provided by a server for viewing in a web browser, mobile applications for execution on a mobile device, editing and design tools, media players, simulation software, or any other application.

As shown in the operational flow of feedback process 200, a graphical user interface (GUI) 109 is displayed on display system 101, wherein GUI 109 includes primary content and a user feedback prompt, and the primary content is displayed on a majority of display system 101 (201). View state 105A on FIG. 1 provides an example of a GUI 109 displaying primary content and a user feedback prompt. As indicated on FIG. 1, the primary content appearing in GUI 109 includes gauges showing barrels per hour and drill speed along with a trend diagram. In this example, GUI 109 comprises a human-machine interface (HMI) application for an oil extraction industry displaying key performance indicators (KPIs) related to the extraction of crude oil. At the bottom of GUI 109 in view state 105A, an exemplary user feedback prompt is shown that provides a selectable link for the user to provide feedback on the ease of use of the tool. Although the user feedback prompt is shown along the bottom of GUI 109 in this example, note that the user feedback prompt could appear anywhere on GUI 109, including in a left-hand or right-hand margin, at the top or in the middle of GUI 109, or anywhere else on GUI 109. In some implementations, the user feedback prompt could be associated with an application that is associated with an industrial automation environment; in this case, the HMI application for the oil extraction industry. In another example, the user feedback prompt could be associated with the primary content and within a context of a workflow of a user. Typically, the user feedback prompt is relatively smaller than the primary content and does not interfere with the workflow of the user. In this example, the user selects the user feedback prompt by tapping the link, as shown by the hand icon appearing on GUI 109 of view state 105A.

Responsive to a user selection of the user feedback prompt, GUI 109 is expanded to reveal a feedback area on display system 101 that provides a mechanism to receive user feedback (202). View state 105B shows an exemplary feedback area that is expanded on GUI 109 in response to the user selecting the user feedback prompt of view state 105A as discussed above. The downward arrow appearing in view state 105B indicates that GUI 109 is expanded to reveal the feedback area below the user feedback prompt. Typically, the primary content remains visible when GUI 109 is expanded to reveal the feedback area on display system 101 to avoid interfering with the user's workflow with the primary content. However, the primary content may scroll partly or fully out of view when the feedback area is expanded in some examples, particularly on smaller display screens. The feedback area in this example displays five radio buttons that range from a scale of "not easy" to "very easy" which provide a mechanism to receive the user feedback.

User input comprising the user feedback is then received (203). The user feedback is typically received in response to a question posed by the user feedback prompt. For example, the user feedback could be received as a level of satisfaction that a user has with GUI 109. In this example, the user supplies user input as a selection of the middle radio button to provide the user feedback, which is represented by the hand icon appearing in view state 105B.

Responsive to receiving the user feedback, GUI 109 is contracted to conceal the feedback area on display system 101 (204). The contracting of GUI 109 is represented by the upward-facing arrow appearing in view state 105C. When GUI 109 is contracted, the feedback area is removed from view, allowing the user to return attention back to the primary content. In this manner, feedback process 200 is minimally intrusive on the user's experience and allows for directed measurement of user satisfaction with specific interfaces. Feedback process 200 also facilitates gathering user feedback even if new software may not be installed, or if the spawning of additional windows may be prohibited for security reasons. An exemplary implementation of another in-context user feedback probe for presentation during a user's workflow process will now be discussed with respect to FIG. 3.

FIG. 3 is a block diagram that illustrates an operational scenario of computing system 300 in an exemplary implementation. Computing system 300 includes display system 301 which displays graphical user interface (GUI) 309. In this example, GUI 309 is provided by human-machine interface (HMI) software that interfaces with a machine in an industrial automation environment, such as a robot that performs a task in a manufacturing facility. GUI 309 displays the operational status of the machine, which is currently shown as "online", and provides a button to stop the operation of the machine.

Beneath the HMI content, a survey question is displayed on GUI 309 in view state 305A. The survey question comprises a usability probe related to the frequency of use of the HMI content appearing above. As described with respect to view state 305A, when the usability probe link is selected, the interface reveals a feedback area with a mechanism to answer the survey question.

View state 305B shows the effect of the user selecting the feedback probe shown in view state 305A, which results in expanding GUI 309 as indicated by the downward-facing arrow next to view state 305B. The newly-exposed feedback area includes several radio buttons for indicating the frequency of use of the HMI feature shown above. The user selects from one of the radio buttons to answer the survey question and selects the "OK" button to complete the usability survey.

After selecting "OK", the feedback area disappears so that the user's attention can return to the workflow, as indicated by the upward-facing arrow shown next to view state 305C. In this example, the user is provided with an option to edit the feedback, which if selected, would again expand GUI 309 in the manner shown in view state 305B so that the user could change the selection. This "accordion-style" feedback interface allows information-gathering during the user's workflow process while minimizing interruption to the user. An exemplary implementation of another in-context user feedback probe for presentation after a process has completed will now be discussed with respect to FIG. 4.

FIG. 4 is a block diagram that illustrates an operational scenario of mobile device 400 in an exemplary implementation. Mobile device 400 includes display system 401 which displays graphical user interface (GUI) 409. In this example, GUI 409 comprises a standard web browser installed on mobile device 400. As shown in view state 405A, a user has accessed a website to search for the name "Smith", and the process has completed with the search results being displayed. Beneath the search results, a feedback prompt asking whether or not the search was successful is shown on GUI 409. When the user selects the feedback link, the interface reveals a feedback area with a survey question and a mechanism to answer the question, as shown in view state 405B.

View state 405B shows that GUI 409 has expanded in response to the user selecting the feedback link on view state 405A. The expansion of GUI 409 is indicated by the downward-facing arrow appearing next to GUI 409 in view state 405B. The feedback area revealed by the expansion of GUI 409 allows the user to enter a measurement of success for the search on a scale of one through nine. The user answers the question by selecting one of the radio buttons to indicate how successful the user deems the search and selects the "OK" button.

After selecting "OK", the feedback area disappears so that the user's attention can return to the outcome of the process, which in this case is the search results. The contracting of GUI 409 is indicated by the upward-facing arrow shown next to view state 405C. Advantageously, revealing a hidden feedback area on GUI 409 within the context of the user's workflow allows for gathering user feedback with minimal measurement impact and without interrupting the process or navigating the user away from the process outcome. By expanding and contracting GUI 409, this technique also preserves valuable screen real estate that is often limited on smaller displays or denser user interfaces. The feedback gathered according to this method can be leveraged to improve user interfaces and enhance the user experience, resulting in increased user satisfaction and ease of use.

Turning now to FIG. 5, a block diagram that illustrates an industrial automation environment 500 in an exemplary implementation is shown. Industrial automation environment 500 provides an example of an industrial automation environment that may be utilized to implement the feedback processes disclosed herein, but other environments could also be used. Industrial automation environment 500 includes computing system 510, machine system 520, industrial controller 525, database system 530, and application integration platform 535. Machine system 520 and controller 525 are in communication over a communication link, controller 525 and database system 530 communicate over a communication link, database system 530 and application integration platform 535 communicate over a communication link, and application integration platform 535 and computing system 510 are in communication over a communication link. Note that there would typically be many more machine systems in most industrial automation environments, but the number of machine systems shown in FIG. 5 has been restricted for clarity.

Industrial automation environment 500 comprises an automobile manufacturing factory, food processing plant, oil drilling operation, microprocessor fabrication facility, or some other type of industrial enterprise. Machine system 520 could comprise a sensor, drive, pump, filter, drill, motor, robot, fabrication machinery, mill, printer, or any other industrial automation equipment, including their associated control systems. A control system comprises, for example, industrial controller 525, which could include automation controllers, programmable logic controllers (PLCs), or any other controllers used in automation control. Additionally, machine system 520 could comprise other industrial equipment, such as a brew kettle in a brewery, a reserve of coal or other resources, or any other element that may reside in an industrial automation environment 500.

Machine system 520 continually produces operational data over time. The operational data indicates the current status of machine system 520, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 520 and/or controller 525 is capable of transferring the operational data over a communication link to database system 530, application integration platform 535, and computing system 510, typically via a communication network. Database system 530 could comprise a disk, tape, integrated circuit, server, or some other memory device. Database system 530 may reside in a single device or may be distributed among multiple memory devices.

Application integration platform 535 comprises a processing system and a communication transceiver. Application integration platform 535 may also include other components such as a router, server, data storage system, and power supply. Application integration platform 535 may reside in a single device or may be distributed across multiple devices. Application integration platform 535 may be a discrete system or may be integrated within other systems—including other systems within industrial automation environment 500. In some examples, application integration platform 535 could comprise a FactoryTalk® VantagePoint server system provided by Rockwell Automation, Inc.

Computing system 510 may be representative of any computing apparatus, system, or systems on which the feedback processes disclosed herein or variations thereof may be suitably implemented. Computing system 510 provides an example of a computing system that could be used as a either a server or a client device in some implementations, although such devices could have alternative configurations. Examples of computing system 510 include mobile computing devices, such as cell phones, tablet computers, laptop computers, notebook computers, and gaming devices, as well as any other type of mobile computing devices and any combination or variation thereof. Examples of computing system 510 also include desktop computers, server computers, and virtual machines, as well as any other type of computing system, variation, or combination thereof.

Computing system 510 includes processing system 501, storage system 503, software 505, communication interface 508, and user interface 509. Processing system 501 is operatively coupled with storage system 503, communication interface 508, and user interface 509. Processing system 501 loads and executes software 505 from storage system 503. Software 505 includes application 506 and operating system 507. Application 506 may include feedback process 200 in some examples. When executed by computing system 510 in general, and processing system 501 in particular, software 505 directs computing system 510 to operate as described herein for feedback process 200 or variations thereof. In this example, user interface 509 includes display system 511, which itself may be part of a touch screen that also accepts user inputs via touches on its surface. Computing system 510 may optionally include additional devices, features, or functionality not discussed here for purposes of brevity.

Turning now to FIG. 6, a block diagram is shown that illustrates computing system 600 in an exemplary implementation. Computing system 600 provides an example of computing system 300, mobile device 400, computing system 510, or any computing system that may be used to execute feedback process 200 or variations thereof, although such systems could use alternative configurations. Computing system 600 includes processing system 601, storage system 603, software 605, communication interface 607, and user interface 609. User interface 609 comprises display system 608. Software 605 includes application 606 which itself includes feedback process 200. Feedback process 200 may optionally be implemented separately from application 606.

Computing system 600 may be representative of any computing apparatus, system, or systems on which application 606 and feedback process 200 or variations thereof may be suitably implemented. Examples of computing system 600 include mobile computing devices, such as cell phones, tablet computers, laptop computers, notebook computers, and gaming devices, as well as any other type of mobile computing devices and any combination or variation thereof. Note that the features and functionality of computing system 600 may apply as well to desktop computers, server computers, and virtual machines, as well as any other type of computing system, variation, or combination thereof.

Computing system 600 includes processing system 601, storage system 603, software 605, communication interface 607, and user interface 609. Processing system 601 is operatively coupled with storage system 603, communication interface 607, and user interface 609. Processing system 601 loads and executes software 605 from storage system 603. When executed by computing system 600 in general, and processing system 601 in particular, software 605 directs computing system 600 to operate as described herein for feedback process 200 or variations thereof. Computing system 600 may optionally include additional devices, features, or functionality not discussed herein for purposes of brevity.

Referring still to FIG. 6, processing system 601 may comprise a microprocessor and other circuitry that retrieves and executes software 605 from storage system 603. Processing system 601 may be implemented within a single processing device but may also be distributed across multiple processing devices or sub-systems that cooperate in executing program instructions. Examples of processing system 601 include general purpose central processing units, application specific processors, and logic devices, as well as any other type of processing device, combinations, or variations thereof.

Storage system 603 may comprise any computer readable media or storage media readable by processing system 601 and capable of storing software 605. Storage system 603 may include volatile and nonvolatile, removable and non-removable media implemented in any method or technology for storage of information, such as computer readable instructions, data structures, program modules, or other data. Storage system 603 may be implemented as a single storage device but may also be implemented across multiple storage devices or sub-systems co-located or distributed relative to each other. Storage system 603 may comprise additional elements, such as a controller, capable of communicating with processing system 601. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the storage media a propagated signal.

In operation, in conjunction with user interface 609, processing system 601 loads and executes portions of software 605, such as feedback process 200, to render a graphical user interface for application 606 for display by display system 608 of user interface 609. Software 605 may be implemented in program instructions and among other functions may, when executed by computing system 600 in general or processing system 601 in particular, direct computing system 600 or processing system 601 to display a graphical user interface (GUI) on display system 608 of computing system 600, wherein the GUI includes primary content and a user feedback prompt, and the primary content is displayed on a majority of display system 608. Software 605 may further direct computing system 600 or processing system 601 to, responsive to a user selection of the user feedback prompt, expand the GUI to reveal a feedback area on display system 608 that provides a mechanism to receive user feedback. Software 605 may further direct computing system 600 or processing system 601 to direct user interface 609 to receive user input comprising the user feedback. Finally, software 605 may direct computing system 600 or processing system 601 to, responsive to receiving the user feedback, contract the GUI to conceal the feedback area on display system 608.

Software 605 may include additional processes, programs, or components, such as operating system software or other application software. Examples of operating systems include Windows®, iOS®, and Android®, as well as any other suitable operating system. Software 605 may also comprise firmware or some other form of machine-readable processing instructions executable by processing system 601. In general, software 605 may, when loaded into processing system 601 and executed, transform computing system 600 overall from a general-purpose computing system into a special-purpose computing system customized to facilitate obtaining feedback for an application as described herein for each implementation.

Communication interface 607 may include communication connections and devices that allow for communication between computing system 600 and other computing systems (not shown) or services, over a communication network 611 or collection of networks. In some implementations, communication interface 607 receives dynamic data 621 over communication network 611. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 609 may include a voice input device, a touch input device for receiving a gesture from a user, a motion input device for detecting non-touch gestures and other motions by a user, and other comparable input devices and associated processing elements capable of receiving user input from a user. Output devices such as display system 608, speakers, haptic devices, and other types of output devices may also be included in user interface 609. The aforementioned user input devices are well known in the art and need not be discussed at length here. User interface 609 may also include associated user interface software executable by processing system 601 in support of the various user input and output devices discussed above. Separately or in conjunction with each other and other hardware and software elements, the user interface software and devices may provide a graphical user interface, a natural user interface, or any other kind of user interface.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. One or more computer-readable storage media having program instructions stored thereon to facilitate obtaining feedback for an application associated with an industrial automation environment, wherein the program instructions, when executed by a computing system, direct the computing system to at least:

display a graphical user interface (GUI) for the application associated with the industrial automation environment on a display system of the computing system, wherein the GUI includes primary content associated with industrial operations and a user feedback prompt, and wherein the primary content is displayed on a majority of the display system;

responsive to a user selection of the user feedback prompt, expand boundaries of the GUI to reveal a new portion of the GUI on the display system comprising a feedback area that provides a mechanism to receive user feedback, wherein the new portion of the GUI on the display system creates new space on the GUI for the feedback area that prohibits an overlap of the new portion of the GUI with any of the primary content;

receive user input comprising the user feedback;

responsive to receiving the user feedback, contract the boundaries of the GUI to conceal the feedback area on the display system; and provide an option to edit the user feedback, wherein selection of the option to edit the user feedback causes the GUI to expand to reveal the new portion of the GUI on the display system comprising the feedback area.

2. The one or more computer-readable storage media of claim 1 wherein the user feedback prompt is displayed at a bottom of the display system.

3. The one or more computer-readable storage media of claim 1 wherein the user feedback prompt is relatively smaller than the primary content and does not interfere with a workflow of a user.

4. The one or more computer-readable storage media of claim 1 wherein the user feedback prompt is associated with the application that is associated with the industrial automation environment.

5. The one or more computer-readable storage media of claim 1 wherein the user feedback prompt is associated with the primary content and within a context of a workflow of a user.

6. The one or more computer-readable storage media of claim 1 wherein the primary content remains visible when the GUI is expanded to reveal the feedback area on the display system.

7. The one or more computer-readable storage media of claim 1 wherein the program instructions direct the computing system to receive the user input comprising the user feedback by directing the computing system to receive a level of satisfaction that a user has with the GUI.

8. A method to facilitate obtaining feedback for an application associated with an industrial automation environment, the method comprising:
displaying a graphical user interface (GUI) for the application associated with the industrial automation environment on a display system of a computing system, wherein the GUI includes primary content associated with industrial operations and a user feedback prompt, and wherein the primary content is displayed on a majority of the display system;
responsive to a user selection of the user feedback prompt, expanding boundaries of the GUI to reveal a new portion of the GUI on the display system prohibited from overlapping any of the primary content and comprising a feedback area that provides a mechanism to receive user feedback;
receiving user input comprising the user feedback;
responsive to receiving the user feedback, contracting the boundaries of the GUI to conceal the feedback area on the display system; and
providing an option to edit the user feedback, wherein selection of the option to edit the user feedback causes the GUI to expand to reveal the new portion of the GUI on the display system comprising the feedback area.

9. The method of claim 8 wherein the user feedback prompt is displayed at a bottom of the display system.

10. The method of claim 8 wherein the user feedback prompt is relatively smaller than the primary content and does not interfere with a workflow of a user.

11. The method of claim 8 wherein the user feedback prompt is associated with the application that is associated with the industrial automation environment.

12. The method of claim 8 wherein the user feedback prompt is associated with the primary content and within a context of a workflow of a user.

13. The method of claim 8 wherein the primary content remains visible when the GUI is expanded to reveal the feedback area on the display system.

14. The method of claim 8 wherein receiving the user input comprising the user feedback comprises receiving a level of satisfaction that a user has with the GUI.

15. An apparatus to facilitate obtaining feedback for an application associated with an industrial automation environment, the apparatus comprising:
one or more computer-readable storage media; and
program instructions stored on the one or more computer-readable storage media that, when executed by a processing system, direct the processing system to at least:
display a graphical user interface (GUI) for the application associated with the industrial automation environment on a display system, wherein the GUI includes primary content associated with industrial operations and a user feedback prompt, and wherein the primary content is displayed on a majority of the display system;
responsive to a user selection of the user feedback prompt, expand boundaries of the GUI to reveal a new portion of the GUI on the display system comprising a feedback area that provides a mechanism to receive user feedback, wherein the new portion of the GUI on the display system creates new space on the GUI for the feedback area that is prohibited from overlapping any of the primary content;
receive user input comprising the user feedback;
responsive to receiving the user feedback, contract the boundaries of the GUI to conceal the feedback area on the display system; and
provide an option to edit the user feedback, wherein selection of the option to edit the user feedback causes the GUI to expand to reveal the new portion of the GUI on the display system comprising the feedback area.

16. The apparatus of claim 15 wherein the user feedback prompt is displayed at a bottom of the display system.

17. The apparatus of claim 15 wherein the user feedback prompt is relatively smaller than the primary content and does not interfere with a workflow of a user.

18. The apparatus of claim 15 wherein the user feedback prompt is associated with the application that is associated with the industrial automation environment.

19. The apparatus of claim 15 wherein the user feedback prompt is associated with the primary content and within a context of a workflow of a user.

20. The apparatus of claim 15 wherein the primary content remains visible when the GUI is expanded to reveal the feedback area on the display system.

* * * * *